C. G. LAMBERT.
SEPARATOR.
APPLICATION FILED SEPT. 4, 1917.

1,262,522.
Patented Apr. 9, 1918.

Witness
Edwin J Beller.

Inventor
Charles G. Lambert,
by Wilkinson & Ginsta,
Attorneys.

UNITED STATES PATENT OFFICE.

CHARLES GUY LAMBERT, OF SHREVEPORT, LOUISIANA.

SEPARATOR.

1,262,522.  Specification of Letters Patent.  Patented Apr. 9, 1918.

Application filed September 4, 1917.  Serial No. 189,606.

*To all whom it may concern:*

Be it known that I, CHARLES GUY LAMBERT, a citizen of the United States, residing at Shreveport, in the parish of Caddo and State of Louisiana, have invented certain new and useful Improvements in Separators; and I do hereby declare the following to be a full, clear, and exact description of the invention, such as will enable others skilled in the art to which it appertains to make and use the same.

My present invention relates to improvements in separators for separating the condensates from gases having different degrees of volatilization; and it is especially intended to provide a separator to be used in separating from the more volatile constituents secured from the distillation of petroleum or its by-products, the condensates therefrom, and keeping these condensates separated from each other according to the volatile nature of the compound from which they were formed.

My present invention especially relates to apparatus of the general type shown in my pending application, apparatus for cracking oils, filed July 7, 1917, Serial No. 179,214.

Figure 1:
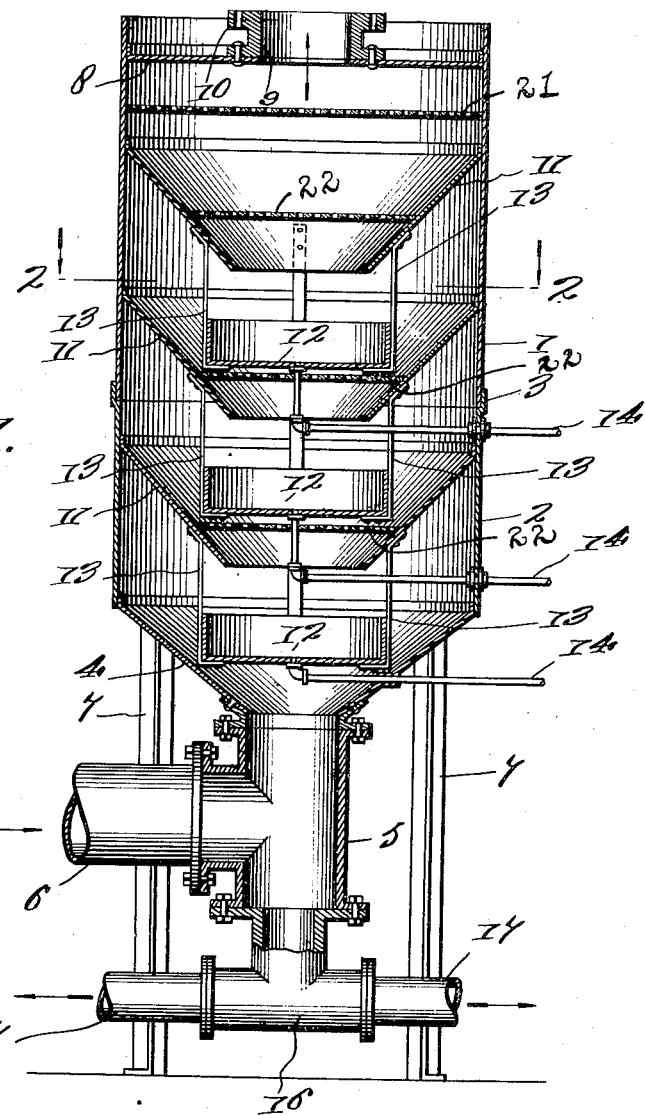
Figure 2:
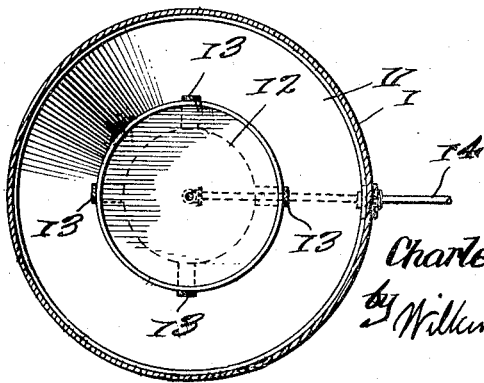

My invention will be understood by reference to the accompanying drawings, in which:

Figure 1 shows a central vertical section through the separator, some parts being shown in elevation; and Fig. 2 shows a section along the line 2—2 of Fig. 1, and looking down.

The separator comprises a cylindrical shell preferably made of two or more sections 1 and 2, telescoping into each other as shown at 3, and which shell is provided with a bottom 4 in the form of a truncated cone which opens into the union 5 connecting the separator with the vapor pipe 6, which vapor pipe 6 is connected to the top of the still, not shown.

The separator is mounted on supports 7. The upper end of the separator shell is provided with a head 8, having a cast iron member 9 flanged, as at 10, to which is secured the pipe, not shown, for carrying off the uncondensed vapors, which vapors would ordinarily be led to a condenser, not shown in this application, but illustrated and described in my application Serial No. 179,214, aforesaid.

Above the cap 8 and surrounding the casting 9 the outer shell of the separator forms an annular trough adapted to hold water, which may be supplied thereto from time to time, thus cooling the top of the separator.

Mounted in the interior of the cylindrical shell are a series of partitions 11, in the form of inverted hollow truncated cones. Beneath openings in the bottom of these cones I provide drip pans 12, suspended from the bottom of the cone, in any convenient way, as by the straps 13.

Near the top of the separator I provide a perforated plate 21 extending across the shell, and in each of the hollow truncated cones, preferably near the lower open end thereof, I provide similar perforated plates 22, which plates materially assist in the separation of the oils from the vapors during the process of distillation.

From the bottom of each drip pan 12 the drain pipe 14 is led, passing through the perforated plate below and through the shell of the separator, and carrying the contents of the pan to any suitable receptacle, not shown.

Beneath the union 5 I provide a T 16, having a pipe 17 for carrying off the liquid falling through the bottom of the separator.

The operation of my invention is as follows:

The vapors from the oil still pass through the vapor pipe 6 and enter the union 5, where any liquid already formed drops down into the T 16 and is carried off by one of the pipes 17. The other vapors rising, will be deflected by the drip pans 12, and will tend to condense on the adjacent conical surface, and the condensates from each partition 11 will drain into the drip pan immediately beneath same, and may be carried off by the corresponding pipe 14.

The condensates from the less volatile products will be condensed and will drain into the lowest drip pan; and there will be a series of successive separations as the uncondensed vapors rise upward, until finally, the still uncondensed vapors pass out of the opening in the top of the separator and are carried to the condenser, where the process of condensing is still further completed.

The shell of the separator is preferably made in segments, as shown, for convenience of assembly and repair.

While I have shown two segments of the shell and three of the conical partitions, there may be any desired number of segments of the shell and any desired number of conical partitions with the corresponding drip pans, dependent upon the degree of separation desired.

Having thus described my invention, what I claim and desire to secure by Letters Patent of the United States is:

A separator comprising a vertically-disposed cylindrical shell having a bottom in the form of a truncated cone, with a T-shaped union for conducting vapors through the opening in said cone, a perforated head mounted below the top of said cylindrical shell, and provided with a flanged member adapted to be connected to the upper pipe and forming with said shell an annular cylindrical cooling chamber adapted to hold water, a series of superposed partitions in said shell in the form of hollow inverted truncated cones with a drip pan mounted beneath each of said cones, and means for carrying off separately the condensates from said drip pan, the said hollow cone shaped partitions being also provided with perforated plates extending across said hollow cone shaped partitions near the openings in the bottom thereof, substantially as described.

In testimony whereof, I affix my signature.

CHARLES GUY LAMBERT.